United States Patent
Frost et al.

(10) Patent No.: US 10,589,370 B2
(45) Date of Patent: Mar. 17, 2020

(54) AUTOMATIC BLOCKED HOLE IDENTIFICATION

(71) Applicant: General Electric Company, Schenectdy, NY (US)

(72) Inventors: Wilson Frost, Cincinnati, OH (US); Russell L. Bouchard, Laurens, SC (US); Clive Andrew Morgan, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 148 days.

(21) Appl. No.: 15/589,057

(22) Filed: May 8, 2017

(65) Prior Publication Data

US 2018/0318952 A1   Nov. 8, 2018

(51) Int. Cl.
*B23H 9/14* (2006.01)
*B23H 9/10* (2006.01)
*B23H 1/02* (2006.01)
*F01D 5/18* (2006.01)

(52) U.S. Cl.
CPC .................. *B23H 9/14* (2013.01); *B23H 9/10* (2013.01); *B23H 1/02* (2013.01); *F01D 5/186* (2013.01); *F05D 2230/12* (2013.01)

(58) Field of Classification Search
CPC .... B23H 9/14; B23H 9/10; B23H 1/02; F01D 5/186; F05D 2230/12
USPC ....................................................... 219/69.13
See application file for complete search history.

(56) References Cited

U.S. PATENT DOCUMENTS

| | | | | | |
|---|---|---|---|---|---|
| 4,393,292 A | * | 7/1983 | Inoue | .................. | B23H 1/02 |
| | | | | | 219/69.14 |
| 4,467,167 A | * | 8/1984 | Oizumi | .................. | B23H 7/28 |
| | | | | | 219/69.13 |
| 4,484,051 A | * | 11/1984 | Yamada | .................. | B23H 1/02 |
| | | | | | 219/69.13 |
| 4,495,394 A | * | 1/1985 | McGregor | .............. | B23H 7/30 |
| | | | | | 219/69.11 |
| 4,663,011 A | * | 5/1987 | Hinman | .................. | B23H 9/10 |
| | | | | | 204/224 M |
| 4,700,039 A | * | 10/1987 | Konno | .................... | B23H 7/16 |
| | | | | | 219/69.13 |
| 4,739,145 A | * | 4/1988 | Check | ..................... | B23H 1/00 |
| | | | | | 219/69.1 |
| 4,762,464 A | * | 8/1988 | Vertz | ....................... | B23H 9/10 |
| | | | | | 219/69.1 |

(Continued)

FOREIGN PATENT DOCUMENTS

WO   2014/038075 A1   3/2014

OTHER PUBLICATIONS

International Search Report and Written Opinion issued in connection with corresponding PCT Application No. PCT/US2018/031265 dated Sep. 12, 2018.

*Primary Examiner* — William M McCalister
(74) *Attorney, Agent, or Firm* — General Electric; James Reed

(57) ABSTRACT

A method for hole formation using an electrical discharge machining tool configured to penetrate metal. The method includes the steps of: penetrating the metal using an electrode to form a hole by moving the electrode away from a starting point; verifying that the hole is complete using the electrical discharge machine; and wherein the verifying step includes the step of probing the hole with the electrode.

16 Claims, 4 Drawing Sheets

(56) References Cited

U.S. PATENT DOCUMENTS

| | | | |
|---|---|---|---|
| 4,786,777 A | 11/1988 | Rupert | |
| 4,798,929 A * | 1/1989 | Itoh | B23H 1/024 219/69.12 |
| 4,808,785 A * | 2/1989 | Vertz | B23H 9/10 219/121.67 |
| 4,857,696 A * | 8/1989 | Taeusch | B23H 5/00 219/121.7 |
| 5,010,224 A | 4/1991 | Shirey et al. | |
| 5,281,788 A * | 1/1994 | Abiko | B23H 9/14 219/69.14 |
| 6,362,446 B1 * | 3/2002 | Jones | B23H 9/10 219/69.11 |
| 6,373,018 B1 * | 4/2002 | Wei | B23H 7/26 219/69.11 |
| 6,403,910 B1 * | 6/2002 | Stang | B23H 7/265 219/69.11 |
| 6,417,475 B1 * | 7/2002 | Duffin | B23H 7/065 219/69.16 |
| 6,448,529 B1 * | 9/2002 | Hiraishi | B23H 1/024 219/69.16 |
| 7,645,958 B2 | 1/2010 | Oda et al. | |
| 7,906,743 B2 | 3/2011 | Sheu | |
| 8,663,450 B1 * | 3/2014 | Kathe | B23H 9/14 204/224 M |
| 8,710,392 B2 | 4/2014 | Mironets et al. | |
| 8,813,824 B2 | 8/2014 | Appleby et al. | |
| 9,126,278 B2 | 9/2015 | Vargas | |
| 9,364,888 B2 | 6/2016 | McBrien et al. | |
| 2003/0192861 A1 * | 10/2003 | Lin | B23H 7/265 219/69.2 |
| 2004/0011768 A1 * | 1/2004 | Beaumont | B23H 1/02 219/69.17 |
| 2004/0200807 A1 * | 10/2004 | Forrester | B23H 7/26 219/69.17 |
| 2005/0082261 A1 * | 4/2005 | Lee | B23H 7/26 219/69.11 |
| 2005/0127042 A1 | 6/2005 | Hastilow et al. | |
| 2005/0173388 A1 * | 8/2005 | Lavers | B23H 9/10 219/121.71 |
| 2005/0269296 A1 | 12/2005 | Arakawa et al. | |
| 2008/0197115 A1 * | 8/2008 | Miyake | B23H 7/265 219/69.11 |
| 2009/0169394 A1 | 7/2009 | Crow et al. | |
| 2010/0051588 A1 * | 3/2010 | Li | B23H 7/20 219/69.17 |
| 2010/0140226 A1 * | 6/2010 | Sheu | B23H 1/022 219/69.13 |
| 2012/0138576 A1 * | 6/2012 | Chuang | B23H 7/02 219/69.12 |
| 2013/0206739 A1 * | 8/2013 | Reed | F01D 25/12 219/121.71 |
| 2014/0186164 A1 * | 7/2014 | Koonankeil | B23H 1/00 415/175 |
| 2015/0209884 A1 | 7/2015 | Hamada et al. | |
| 2016/0298218 A1 | 10/2016 | Kilmer et al. | |
| 2017/0072487 A1 * | 3/2017 | Luo | B23H 1/028 |
| 2017/0072488 A1 * | 3/2017 | Luo | B23H 1/028 |
| 2017/0072490 A1 * | 3/2017 | Hamada | B23H 7/20 |
| 2018/0311753 A1 * | 11/2018 | Kao | B23H 7/20 |
| 2018/0318952 A1 * | 11/2018 | Frost | B23H 9/14 |

* cited by examiner

AUTOMATIC BLOCKED HOLE IDENTIFICATION

BACKGROUND OF THE INVENTION

The present invention relates to hole formation in a machine component and more specifically to a method for determining whether a hole is blocked or is completely formed through a turbo-machinery component wall.

Airfoils in a turbine engine often include cooling holes for discharging a film of cooling air along the outer surface of the airfoil to affect film cooling. These may be referred to as "film cooling holes" or "film holes."

Generally, cooling holes extend through a wall in an aircraft component from an entry end to an exit end. It is critical that these holes be formed completely through the respective component. In order for proper cooling, all cooling holes should be formed completely through the wall of the component. Blocked holes will result in overheated areas or "hotspots." Blocked holes can be the result of incomplete hole formation or of debris in the hole.

One problem with current methods for producing cooling holes is that it is very difficult and time-consuming to determine whether a cooling hole is properly formed through the wall of the component. If one or more holes are not formed properly, the component is reworked and the blocked holes are re-drilled. In order to re-drill a hole, the equipment must be repositioned over the hole.

Conventional methods of verifying whether a cooling hole is properly formed include pin checks and water checks. Pin checks require an operator to manually insert a pin into the hole to determine whether the pin passes completely through the associated wall. In water checks, water pressure is applied within an airfoil and the hole is observed to determine whether water passes through it. Both of these methods have associated problems. The pin check method is manual and can result in repetitive motion injuries. The water check method can be inaccurate. Therefore there is a need for a method for forming cooling holes through aircraft components which incorporates a step of verifying whether a cooling hole is properly formed through the component or is blocked and for reworking such a hole before another hole is started.

BRIEF DESCRIPTION OF THE INVENTION

This need is addressed by a method for verifying an initial indication that a hole is complete as part of the hole formation process.

According to one aspect of the technology described herein, there is provided a method for hole formation using an electrical discharge machining tool configured to penetrate metal. The method includes the steps of: penetrating the metal using an electrode to form a hole by moving the electrode away from a starting point; verifying that the hole is complete using the electrical discharge machine; and wherein the verifying step includes the step of probing the hole with the electrode.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
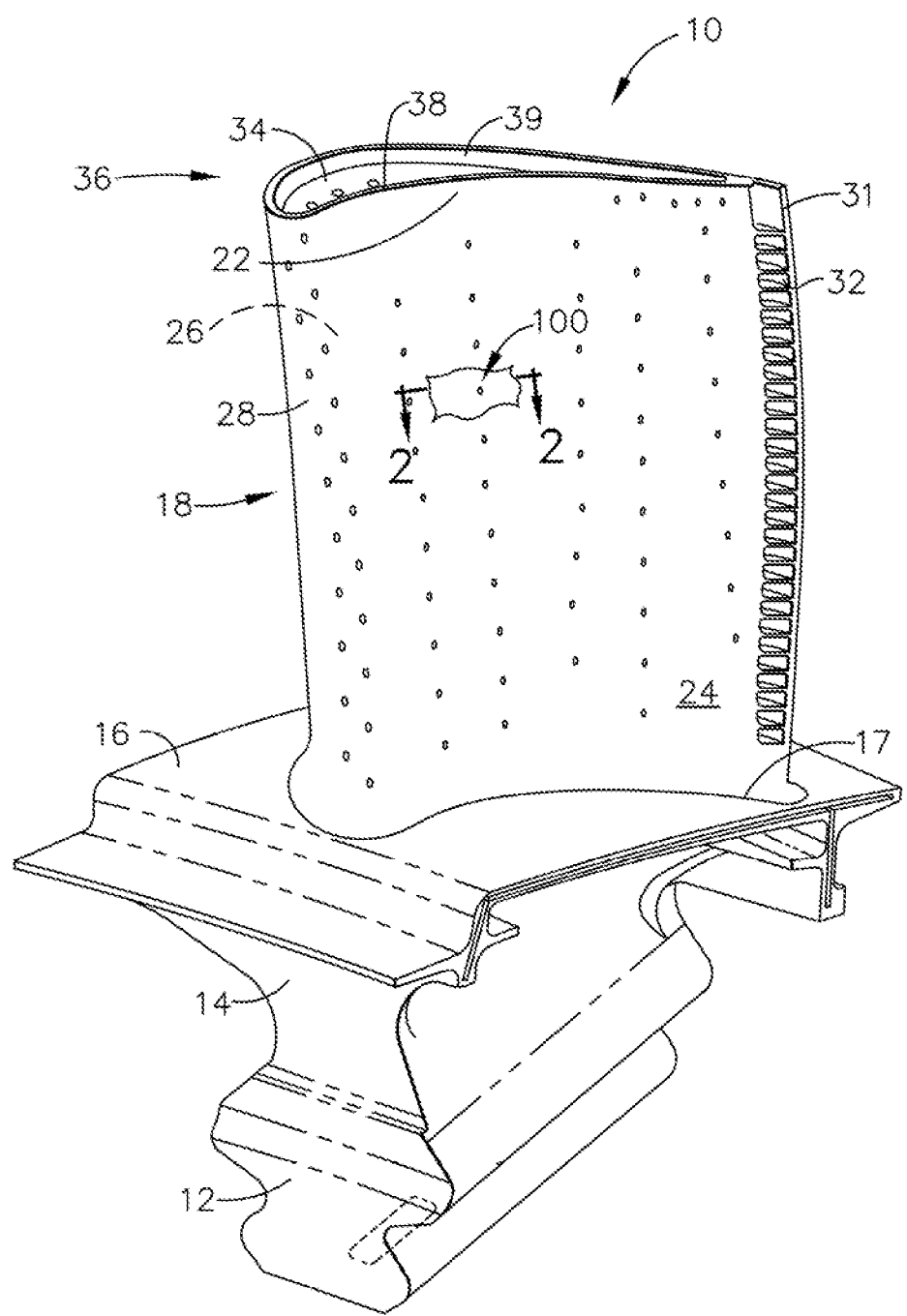
FIG. 1 is a perspective view of a turbine blade for inclusion in an aircraft engine wherein a wall of the turbine blade includes multiple film holes for cooling the wall.

Referring to the drawings wherein identical reference numerals denote the same elements throughout the various views, FIG. 1 illustrates an exemplary turbine blade 10. The turbine blade 10 includes a conventional dovetail 12, which may have any suitable form, including tangs that engage complementary tangs of a dovetail slot in a rotor disk (not shown) for radially retaining the blade 10 to the disk as it rotates during operation. A blade shank 14 extends radially upwardly from the dovetail 12 and terminates in a platform 16 that projects laterally outwardly from and surrounds the shank 14. A hollow airfoil 18 extends radially outwardly from the platform 16 and into the hot gas stream. The airfoil has a root 17 at the junction of the platform 16 and the airfoil 18, and a tip 22 at its radially outer end. The airfoil 18 has a concave pressure side wall 24 and a convex suction side wall 26 joined together at a leading edge 28 and at a trailing edge 31.

The airfoil 18 may take any configuration suitable for extracting energy from the hot gas stream and causing rotation of the rotor disk. The airfoil 18 may incorporate a plurality of trailing edge bleed slots 32 on the pressure side wall 24 of the airfoil 18, or it may incorporate a plurality of trailing edge cooling holes (not shown). The tip 22 of the airfoil 18 is closed off by a tip cap 34 which may be integral to the airfoil 18 or separately formed and attached to the airfoil 18. An upstanding squealer tip 36 extends radially outwardly from the tip cap 34 and is disposed in close proximity to a stationary shroud (not shown) in the assembled engine, in order to minimize airflow losses past the tip 22. The squealer tip 36 comprises a pressure side tip wall 38 disposed in a spaced-apart relationship to a suction side tip wall 39. The tip walls 38 and 39 are integral to the airfoil 18 and form extensions of the pressure and suction side walls 24 and 26, respectively. The outer surfaces of the pressure and suction side tip walls 38 and 39 respectively form continuous surfaces with the outer surfaces of the pressure and suction side walls 24 and 26.

Figure 2:
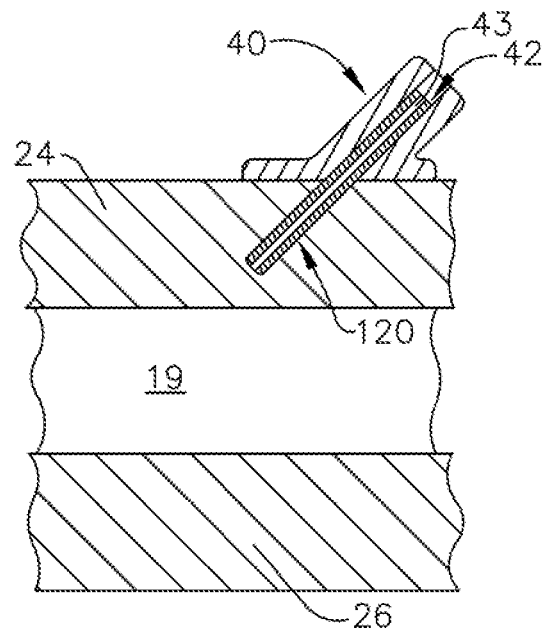
FIG. 2 is a cross-sectional view of a portion of a wall during an initial penetrating step of hole formation through the wall of the turbine blade of FIG. 1 taken along line 2-2 in FIG. 1.

A plurality of film cooling holes 100 pass through the pressure side wall 24. The film cooling holes 100 of the airfoil 18 communicate with an interior space 19 as shown in FIG. 2. The interior space 19 may include a complex arrangement of cooling passageways defined by internal walls. By way of example and not limitation, the cooling passageways can include one of the following characteristics: serpentine, intertwined, intersecting, non-intersecting, and a combination thereof. It should be appreciated that airfoil 18 may be made from a material such as a nickel-based or cobalt-based alloy having good high-temperature creep resistance, known conventionally as "superalloys."

Referring now to FIGS. 2-7, the present invention provides a method for forming a hole 100 through a wall. In the illustrated embodiment, a hole is formed through the pressure wall 24 using an electrical discharge machining tool 40. The electrical discharge machining process is referred to as EDM herein. It should be appreciated that the machine 40 includes a computer processor (not shown) configured to store, manipulate, compared, and monitor data such as travel distances, applied force, hydraulic pressure, electrical properties, and the like as indicated below. The EDM tool 40 also includes a tubular electrode 42 that extends to a tip 45. Electrode 42 includes a conduit 43 formed there through for flushing debris from the hole being formed and for providing an electrolyte solution. In an EDM process, fluid is pushed in through conduit 43 of the electrode 42 for lubrication.

Figure 3:
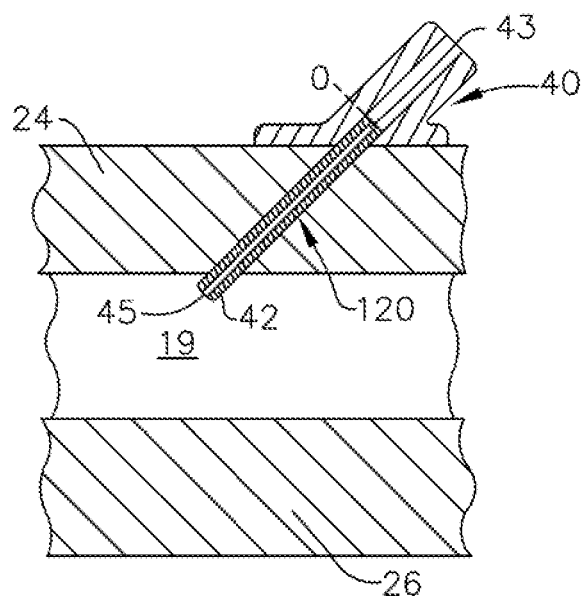
FIG. 3 is a cross-sectional view of the portion of the wall shown in FIG. 2 showing penetration of the wall by an electrode.

In a hole forming, or penetrating, step; voltage is applied to the electrode such that the electrode 42 erodes an in-process hole 120 into the wall 24 as shown in FIG. 2. According to the thinking step, the electrode 42 away from a starting point. Once the tip 45 is through the wall 24 as shown in FIG. 3, the electrode 42 must stop to avoid crossing the interior space 19 and penetrating the wall 26 of the airfoil 18.

There is a monitoring status step to determine whether the EDM tool 40 has completely formed the in-process hole 120 through the wall 24. In this regard, the EDM tool 40 is configured to monitor a predetermined property during the penetrating step. The property can be an electrical property such as voltage or current. Alternatively, the property can be a hydraulic property associated with the electrolyte such as flow or pressure. When the predetermined property reaches a predetermined value, the machine 40 stops the penetrating step. Stated another way, the computer processor of machine 40 determines during the monitoring status step that the hole is complete. According to conventional processes, the machine 40 would then be moved to another location to form another hole.

Figure 4:
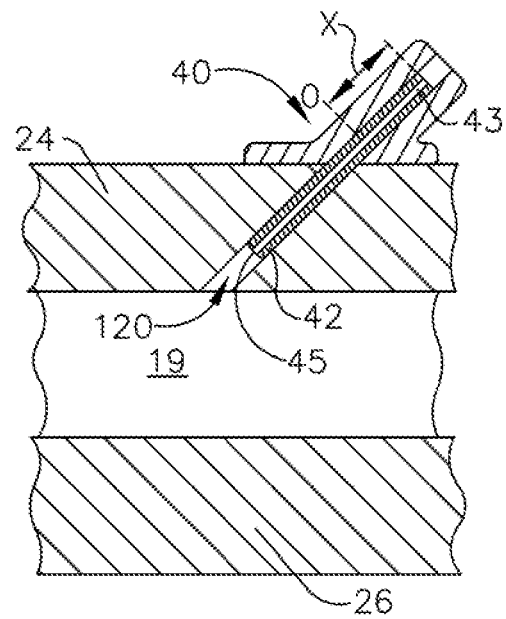
FIG. 4 is a cross-sectional view of the portion of the wall shown in FIG. 3 showing that the electrode is withdrawn during a verification step when the hole was initially correctly identified as complete.

In contrast to conventional processes, the present invention provides a verifying step that occurs before the EDM tool 40 is relocated. The verifying step includes a probing steps and a retracting step. In the probing step, a travel first distance Y is determined as described below. Referring now to FIG. 4, in the retracting step the electrode 42 used to form the in-process hole 120 is retracted a predetermined second distance X. During the probing step the electrode 42 is reinserted into the hole 120 until it stops. During the probing step, the electrode is stopped by contact with the bottom of an incompletely formed hole 120, an indication of monitored properties as described above, or because the probe has reached the maximum travel distance. The maximum travel distance can be determined by a second physical machine stop, or by a measurement such as a predetermined maximum third distance. The predetermined maximum third distance is greater than the predetermined second distance X and is determined such that the tip 45 of the probe 42 can extend from an unblocked and completely formed hole 120 into the space 19. The predetermined maximum third distance can be fixed by the mechanical limits of machine 40.

Figure 5:
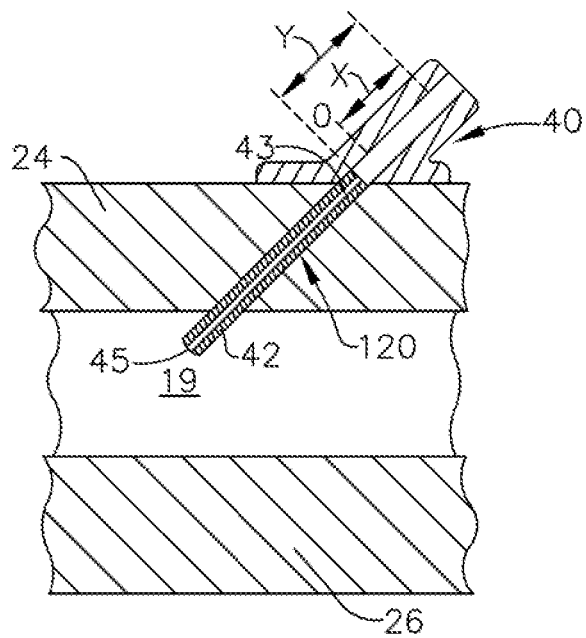
FIG. 5 is a cross-sectional view of the portion of the wall shown in FIG. 4 showing the electrode extending through the wall during the verification step when the hole was initially correctly identified as complete.

In this regard, the machine 40 can be configured such that, by moving the predetermined maximum third distance, the electrode 42 can travel into the in-process hole 120 such that the electrode tip 45 of the electrode 42 extends through the wall 24. The actual travel first distance is indicated as Y as shown in FIG. 5 and is monitored by the computer processor.

When the electrode 42 stops traveling during the probing step, the travel first distance Y is noted. If the travel first distance Y is greater than the predetermined second distance X, and about equal to predetermined maximum third distance, it is concluded that the in-process hole 120 is open. It should be appreciated that the during the penetrating step, the hole 120 might be formed such that a space exists between the tip 45 of the electrode and the bottom of the hole 120. It should be appreciated that the predetermined maximum third distance is chosen such that the space, if any, is accounted for. In addition, a deadband value can be added to the predetermined second distance X to account for his process variability space. The deadband may be determined by process understanding. The travel first distance Y would be compared to predetermined second distance X plus the deadband value. In a retracting step, the electrode 42 is withdrawn from the in-process hole 120 and the EDM tool 40 is relocated to form another in-process hole 120 at a new predetermined location.

Figure 6:
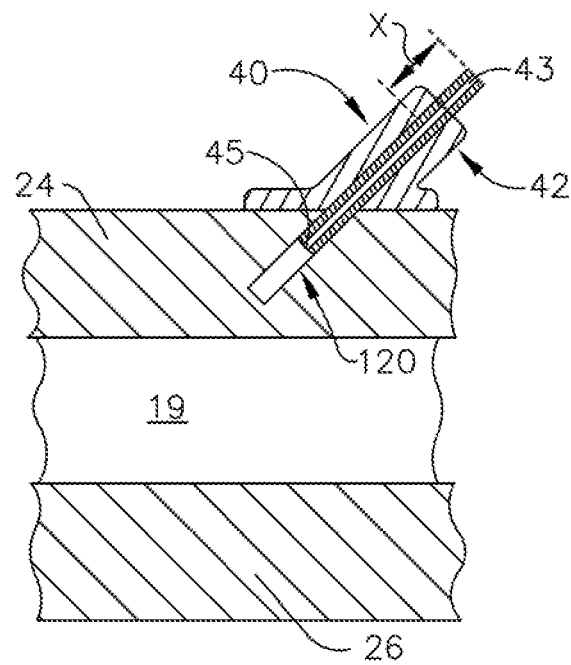
FIG. 6 is a cross-sectional view of the portion of the wall shown in FIG. 2 showing that the electrode is withdrawn during a verification step when the hole was initially incorrectly identified as complete.
Figure 7:
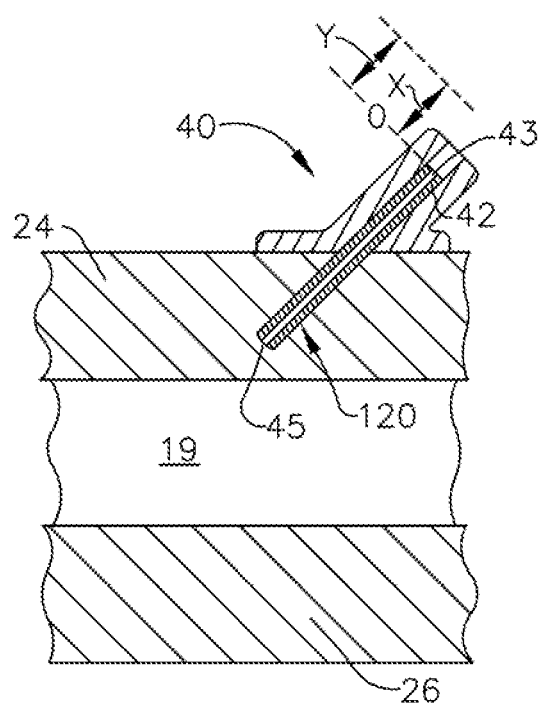
FIG. 7 is a cross-sectional view of the portion of the wall shown in FIG. 6 showing the electrode positioned within the hole during the verification step when the hole was initially incorrectly identified as complete.

FIG. 6 illustrates an example wherein the monitored predetermined property incorrectly indicated that the in-process hole 120 was complete. In this situation, the electrode 42 is withdrawn in the retracting step the predetermined second distance X as indicated above. The probing step is initiated and travel first distance Y of the electrode 42 is measured as described above. As shown in FIG. 6, the electrode 42 is prevented from further travel during the probing step because the hole is blocked. The travel first distance Y is not about equal to the predetermined maximum third distance and is not substantially greater than the predetermined second distance X. Thus it is determined that the hole is blocked. At this time, the hole forming or penetrating step is reinitiated. The progress of the in-process hole 120 is verified as described above by the computer processor based upon the monitored property. In this regard, when the property reaches a predetermined value, the hole forming step is stopped and a verifying step is initiated.

The cycle of hole formation and verifying can continue until the hole is determined to be properly formed through the component wall.

According to an alternative by, electrode 42 stopped during the monitoring step thus defining a stopping point. In the probing step, electrode 42 is then moved further away from the starting point and past the stopping point without first being retracted toward the starting point.

The foregoing has described a method for forming cooling holes in the airfoil. The method includes steps for verifying and confirming whether the hole was satisfactorily formed prior to formation of another hole. This method can reduce or eliminate the need for off-line quality checks such as pin checks and water checks for hole formation. Thus the process for forming holes is more efficient and less labor-intensive according to the present invention.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method for hole formation using an electrical discharge machining tool configured to penetrate metal, the method comprising the steps of:
   penetrating the metal using an electrode to form a hole by moving the electrode away from a starting point in a first direction;
   verifying that the hole is complete and open using the electrical discharge machine, the verifying step including the steps of:
      retracting the electrode in a second direction a predetermined distance X;
      probing the hole with the electrode, the probing step including the steps of:
         advancing the electrode in the first direction a distance Y; and
         comparing the distance Y to the predetermined distance X after the electrode is stopped;
      determining that the hole is incomplete if the distance Y is equal to or less than the predetermined distance X.

2. The method according to claim 1, further comprising the step of:
   resuming the penetrating step to continue to form the hole if the hole was determined to be incomplete.

3. The method according to claim 1, wherein the probing step includes the step of:
   monitoring the distance Y during the probing step.

4. A method for hole formation using an electrical discharge machining tool configured to penetrate metal, the method comprising the steps of:
   penetrating the metal using an electrode to form a hole by moving the electrode away from a starting point in a first direction;
   verifying that the hole is complete and open using the electrical discharge machine, the verifying step including the steps of:
      retracting the electrode in a second direction a predetermined distance X;
      probing the hole with the electrode, the probing step including the steps of:
         advancing the electrode in the first direction a distance Y; and
         comparing the distance Y to the predetermined distance X after the electrode is stopped; and
      determining that the hole is incomplete if the distance Y is equal to or less than the predetermined distance X plus a deadband value.

5. The method according to claim 1, wherein the verifying step includes the step of comparing the distance Y to a predetermined maximum value.

6. The method according to claim 5, wherein the verifying step includes the steps of:
   determining that the hole is incomplete if the distance Y is less than the predetermined maximum value and resuming the penetrating step; and
   determining that the hole is complete if the distance Y is greater than or equal to the predetermined maximum value.

7. The method according to claim 1, wherein the probing step includes the step of:
   determining whether a tip of the electrode passed through a wall of a component.

8. A method for hole formation using an electrical discharge machining tool that includes an electrode configured to penetrate metal, the method comprising the steps of:
   positioning the electrical discharge machining tool on a component in which a hole is to be formed;
   forming the hole by penetrating the metal using an electrode moving in a first direction, the electrode having a voltage applied thereto;
   monitoring a predetermined property associated with the electrode during the step of forming the hole;
   stopping the forming a hole step thereby defining a stopping location when the predetermined property reaches a predetermined value;
   verifying that the hole is complete by
   attempting to move the electrode, without a voltage applied thereto, further in the first direction relative to the stopping location.

9. The method according to claim 8, further comprising the step of:
   monitoring a distance Yin the attempting to move the electrode step.

10. The method according to claim 9, further comprising the step of:
    comparing the distance Y to a predetermined maximum distance.

11. The method according to claim 10, further comprising the step of:
    determining that the hole is complete if the distance Y is equal to or greater than a predetermined distance X; and
    determining that the hole is not complete if the distance Y is less than the predetermined maximum distance.

12. The method according to claim 11, further comprising the step of withdrawing the electrode to a predetermined location.

13. The method according to claim 8, wherein the component is an airfoil.

14. The method according to claim 13, wherein the hole is formed through a wall of the airfoil.

15. The method according to claim 10, wherein a predetermined maximum distance is chosen such that electrode does not cross a space defined within the airfoil.

16. The method according to claim 4, further including the step of resuming the penetrating step if the hole is incomplete.

* * * * *